United States Patent [19]
Robinson

[11] 3,732,470
[45] May 8, 1973

[54] ELECTROLYTIC DEVICE AND SEMICONDUCTOR OXIDE ELECTROLYTE THEREFORE

[76] Inventor: Preston Robinson, Bulkley St., Williamstown, Mass. 01267

[22] Filed: Dec. 20, 1971

[21] Appl. No.: 210,083

Related U.S. Application Data

[63] Continuation-in-part of Ser. No. 767,516, Oct. 14, 1968, Pat. No. 3,631,302.

[52] U.S. Cl. ....................317/230, 204/33, 204/42, 29/570
[51] Int. Cl. ...............................................H01g 9/04
[58] Field of Search....................317/230, 231, 232, 317/233; 29/25.31, 570

[56] References Cited

UNITED STATES PATENTS

| | | | |
|---|---|---|---|
| 3,100,329 | 8/1963 | Sherman | 317/230 X |
| 3,254,390 | 6/1966 | Shtasel | 29/25.31 |
| 3,345,544 | 10/1967 | Metcalfe | 317/230 |
| 3,397,446 | 8/1968 | Sharp | 29/570 |
| 3,631,302 | 12/1971 | Robinson | 317/230 |

Primary Examiner—James D. Kallam

[57] ABSTRACT

A solid electrolytic capacitor is produced by competing electrolytic reactions that produce a dielectric film on the surfaces of a porous anode and a layer of semiconductive oxides on the dielectric film. Current is passed through the anode and a suitable cathode in an aqueous electrolyte containing a film-forming anion and cation capable of being oxidized to a semiconductive layer on the surface of the dielectric film. The thickness of the semiconductive layer is controlled by an intermediate step of depositing a given amount of a hydroxide of the cation on the dielectric film by reversing the current between the initial and final oxidation.

4 Claims, 2 Drawing Figures

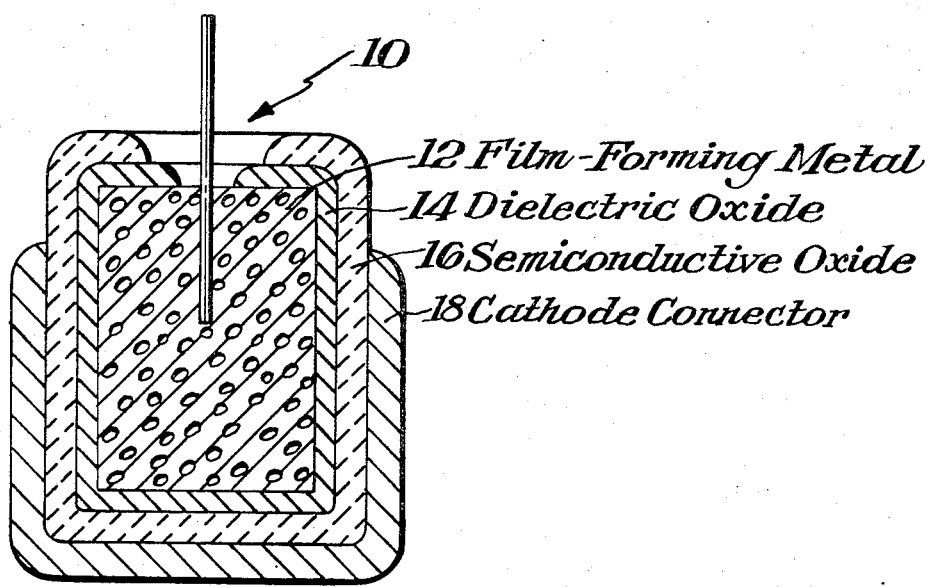

Fig.1.
- 12 Film-Forming Metal
- 14 Dielectric Oxide
- 16 Semiconductive Oxide
- 18 Cathode Connector

Fig.2.

> Making a porous anode of film-forming metal powders by powder metallurgy techniques > Anodizing said anode in an electrolyte containing both a film-forming anion and a semiconductive oxide forming cation to produce a dielectric oxide on said metal.

> Reversing the current to produce a metal hydroxide in the pores of said anode.

> Continuing anodizing in said electrolyte to produce a semiconductive oxide in intimate contact with said dielectric oxide.

> Continuing anodizing in said electrolyte to produce additional dielectric oxide on said metal.

ELECTROLYTIC DEVICE AND SEMICONDUCTOR OXIDE ELECTROLYTE THEREFORE

CROSS-REFERENCE TO RELATED APPLICATION

This application is a continuation-in-part of Ser. No. 767,516 filed Oct. 14, 1968 and issued on Dec. 28, 1971 as U.S. Pat. No. 3,631,302.

BACKGROUND OF THE INVENTION

This invention relates to an electrolytic device and a semiconductor oxide electrolyte therefore, and more particularly relates to a solid electrolytic capacitor employing in situ formed oxides.

My above-identified parent application discloses the preparation of a solid electrolytic capacitor in an electrolyte containing a film-forming anion and a metal cation capable of being oxidized to a semiconductive oxide and wherein the two electrolytic oxidations take place at different speeds. the faster oxidation generally being the formation of the dielectric film at constant current, wherein the voltage across the electrolytic cell increases steadily with concommitant formation of the dielectric film until a critical voltage is reached, at which point the voltage remains steady for a length of time depending on the concentration of the metal cation in the electrolyte and the semiconductive layer is formed over and in intimate contact with the dielectric layer, whereupon the voltage again begins to rise corresponding to renewed formation of the dielectric layer. At a perdetermined voltage, the voltage is maintained at a fixed value and the current decreases until an arbitrary value is reached. This is the result of formation of dielectric film both by electrolytic oxidation and by the self-healing interaction of the semiconductor layer with unreacted metal below pores in the films as evidenced by random sparking and momentary increases in the leakage current followed a greater decrease in the leakage current.

The anode is then ready to be made into a condenser by the formation of a cathode usually by coating with colloidal graphite, drying, and further coating with a metal such as silver or copper. As noted in my above identified parent application, the semiconductor layer so formed is sometimes too thin to stand up under the mechanical handling of making the cathode and this layer must then be thickened.

It is an object of this invention to provide an electrolytic device having oxides formed in a continuous in situ process that are thick enough to withstand subsequent manufacturing procedures.

Another object is to provide a continuous in situ production of oxides in and on a porous pellet.

SUMMARY OF THE INVENTION

In accordance with this invention the in situ production of oxides on an anode body by continuous anodization in an electrolyte containing both a film-forming anion and a semiconductive oxide forming cation includes thickening the oxides at a suitable stage in the process by reversing the current whereby the hydroxide of the cation is deposited on what is now the cathode and when the current is again reversed the hydroxide is oxidized to form additional thickness to the semiconductor layer.

I have found this process to be of particular importance in the case of porous anodes. Here the formation of the dielectric film takes place on all the surfaces of the anode exposed to the electrolyte, but the semiconductor layer is formed first of the outermost layer of the anode and tends to interfere with the continued formation of the semiconductive layer in the innermost recesses of the porous anode. However, by reversing the current, the cations are carried into these innermost recesses and are precipitated as the hydroxide. On again reversing the current, the hydroxide is oxidized to form the semiconductive layer on the dielectric film throughout the porous anode.

BRIEF DESCRIPTION OF THE DRAWING

FIG. 1 is a cross section of a condenser made of a porous anode in accordance with this invention; and FIG. 2 is a flow sheet of the method of this invention by which the condenser of FIG. 1 is produced.

DESCRIPTION OF THE PREFERRED EMBODIMENTS

FIG. 1 shows a condenser 10 having a porous anode 12 of film-forming metal having an embedded lead-wire of film-forming metal, and having a dielectric oxide film 14 formed in and on the anode 12. A semiconductive oxide layer 16 is formed in intimate contact with the dielectric oxide film 14 throughout anode 12. A conducting cathode connector 18 is provided over the interior coating of semiconductive oxide 16.

While porous tantalum anodes made by various powder metallurgy techniques are commercially available, those of aluminum are not. The Al anodes used herein were made of 99.99 percent Al powder through 320 mesh or 400 mesh. A weighed amount of powder was placed in a cylindrical cavity with movable pistons at both ends. One piston was perforated to permit insertion of a lead-wire into the powder. Both pistons were then displaced a predetermined amount with pressures of about 250–300 psi and produced a pellet of the desired porosity. The pellet was then sintered at near 600°C in a relatively inert atmosphere of He or A or in a vacuum and produced pellets ranging from 50 to 55 percent of bulk density of Al, thus with a porosity of 50 to 45 percent. In some cases the exterior of the pellet had a thin brownish superficial coating when sintered in vacua of $10^{-4}$ torr, by reacting with residual $N_2$. However, the formation of a dielectric oxide coating was accomplished with no increase in power consumption and with a disappearance of the color.

The color could also be removed by making the pellet the cathode in an electrolyte containing a strong alkali cation such as $Na^+$, $K^+$, quanidine$^+$, or quaternary ammonium$^+$ ions or the like. While this treatment is unnecessary to remove the brown or black stain, it had the desirable effect of dissolving or dislodging any unsintered aluminum powder left in the pellet. This is desirable and is therefore incorporated into one of my process steps which deposits a metal hydroxide in the pores of the pellet.

EXAMPLE 1

An electrolyte is made up containing 8 grams per liter ammonium dihydrogen phosphate and 8 grams per liter of lead acetate. A fine white precipitate of a lead salt is formed which is maintained in suspension by suitable agitation and the resulting electrolyte has a pH in the region of 5 to 5.5. A porous tantalum anode weighing 0.75 grams is made the anode in this electrolyte, and a suitable cathode which may be carbon is provided. On passing a direct current of 100 milliamperes between the electrodes, the voltage increases steadily in 9 or 10 minutes to a voltage in the neighborhood of 175 to 200 volts and this is the formation of a dielectric layer. At this point the formation of the semiconductor layer begins and at a current of 100 milliamperes the voltage drops to the neighborhood of 125 volts and over a period of 10 minutes increases again to the former voltage of between 175 and 200 volts and this is primarily the formation of the semiconductor layer. Subsequently at the same current, the voltage rises more rapidly to the neighborhood of 300 volts which is close to what is known in the art as the breakdown voltage of the electrolyte. When this voltage is maintained constantly for a few minutes, the current drops rapidly from 100 milliamperes to below 10 milliamperes.

The electrodes from the foregoing example are then made into condensers by adding suitable cathode material such as suspension of graphite (aquadag) followed by the application of a conductor which may be silver in the form of paste or other conductor provided by flame spraying or sputtering. The assembly is then suitably dried to remove the last traces of solvent employed in the various processes and assembled in a suitable container. The anode from Example 1 has the following characteristics: a leakage current of 1 milliampere and a capacity of 5.0 microfarads.

While these condensers have utility, it is desirable in some cases to employ a thicker semiconductor layer because of the rough handling which may result in assembly operations. This may be accomplished by employing electrolytes containing higher concentrations of the cation which goes to form the semiconductor oxide layer, and by reversing the current to produce metal hydroxide in the pores of the anode, and then reoxidizing in the original electrolyte.

EXAMPLE 2

A solution of 8 grams per liter of lead acetate is neutralized with alkali until a slight permanent precipitate is formed. A Ta electrode as used above, is made the cathode in this bath, a suitable anode is carbon, and a current of 100 milliamperes is passed for one minute. The Ta electrode is now coated with lead hydroxide is then subjected to the process of Example 1 giving characteristics of 350 microamperes and a capacity of 8.5 microfarads.

It will be observed that this treatment has nearly doubled the capacity of Example 1 and developed more than 90 percent of the capacity measured in an aqueous electrolyte. Evidently, the semi-conducting layer in Example 1 plugged some pores in the anode preventing access to all the dielectric film, and that by carrying out the process step of Example 2, nearly the entire capacity was realized, together with a decrease in leakage current.

EXAMPLE 3

A smaller Ta anode of 0.55 gms was anodized in an aqueous electrolyte containing 7 g.p.l. of $HClO_4$ and 8 g.p.l of Pb $(C_2H_3C_2)_2$, to which sufficient $(C_2H_5)_3N$ was added to bring the pH to 6. Dielectric film was formed to about 80 V whereupon the $PbO_2$ was formed. The electrode was then made the cathode in a boiling electrolyte of 2M $Pb(NO_3)_2$ and 0.3M $KNO_2$ and 50 milliamperes was passed for 30 seconds, depositing $Pb(OH)_2$ in the electrode and evolving $H_2$. The electrode was then made the anode in the original electrolyte and reanodized. The oxidation of $Pb(OH)_2$ to $PbO_2$ began at about 60 V and was completed at 100 V at which voltage the leakage current dropped rapidly. The electrode was rinsed thoroughly in distilled water and given a final formation in an electrolyte 1 g.p.l. of trimellitic acid until the leakage current was less than 1 milliampere. The condenser was finished as in Example 1 and showed a capacity of 1.5 mfd. and a series resistance under 100 ohms.

Similar results were obtained when Ni and Mn were substituted for Pb in the boiling nitrate reverse current step, the Ni giving identical result while the Mn gave a lower capacity and a higher resistance due to the poorer conductivity of $MnO_2$.

Some care must be exercized in the reverse current step lest the pores be completely filled with the semiconductive oxide and the characteristics of the device become governed by this layer. Thus doubling the coulombs passed in Example 3 cuts the effective capacity to 0.50 mfd., and passing 10 times the coulombs cuts it to 0.025. Thus there is an optimum value of the coulombs readily determined by those skilled in the art.

EXAMPLE 4

An Al anode described above weighing 0.4 gms was anodized in an electrolyte of 1 g.p.l. trimellitic acid to 50 V forming a dielectric film. The electrode was made a cathode in a boiling electrolyte of 2M $Pb(NO_3)$, 0.3M $KNO_2$ and 0.001M Ag $C_2H_3O_2$; and 50 milliamperes was passed for 10 seconds. The electrode was rinsed in distilled water and reformed to 100 V in the original electrolyte giving a capacity of 10.0 mfd. and a series resistance under 10 ohms.

For film forming metals I have used Ta, Al and Nb. For cations forming semiconductive layers I have used $Pb^{++}$, $Mn^{++}$, $Ni^{++}$, $Ag^+$ and mixtures thereof. For film forming electrolytes, I have used the following acids and their salts giving pH's between 4.5 and 8.5: trimellitic acid, pyromellitic acid, terephthalic isophthalic, uric, sulfamic, perchloric, persulphate, phosphoric. I have avoided those combinations which produce salts of extremely low solubility such as lead pyromellitate.

In the reverse current step when hydroxides are formed by the generation of hydroxyl ions at the cathode, I have found it preferable to start with acid solutions of pH6 or lower as otherwise the hydroxide precipitates on the outside of the electrode rather than in the pores.

I have also found that with strong oxidizing acids such as perchloric and persulfate that the semiconductive oxide can be produced chemically as well as electrochemically. This is of no great harm but it does consume the cations and they must be continually replaced. This purely chemical reaction may take place preferentially in the porous electrode by the prior introduction into the electrode of $Ag^+$ as a catalyst.

In the case of Al, I have found some dielectric oxide film must be present if chemical reduction of the cations and resulting corrosion of the Al is to be avoided.

What is claimed is:

1. An electrolytic capacitor comprising a porous pellet of film-forming metal, a dielectric oxide film formed on the surfaces of said porous pellet, a reducible semiconductive oxide electrolyte in intimate contact with said dielectric film, a portion of said semiconductive oxide being converted from the hydroxide, and a conductive cathode connector in contact with said oxide electrolyte, said dielectric film and said semiconductive oxide electrolyte being in situ formed in one continuous electrolytic formation of said porous pellet in a single solution containing both a film forming anion and a semiconductive oxide forming cation.

2. The device of claim 1 wherein said porous pellet is a member of the group consisting of aluminum, tantalum and niobium; said film forming anion is a member of the group consisting of phosphate, borate, persulfate, urate, trimellitate, pyromellitate, terephthalate, isophthalate, perchlorate and sulfamate; and said semiconductive oxide forming cation is a member of the group consisting of Mn, Ni, Ag, Pb, and mixtures thereof.

3. A method of making an electrolytic device having a film-forming metal coated with a dielectric film and a superimposed semiconductive layer comprising the steps of producing a porous pellet of a film-forming metal, anodizing said porous pellet in an electrolyte containing both a film forming anion and a semiconductive oxide forming cation to produce said dielectric film, cathodically depositing the hydroxide of said cation in and on said porous pellet, continuing anodization in said electrolyte to produce said semiconducting oxide layer in intimate contact with said dielectric film, continuing anodization in said electrolyte still further to produce additional dielectric film, and making connections to said porous pellet and to said semiconducting oxide layer.

4. The method of claim 3 where a cation of a strong alkali is also present.

* * * * *